United States Patent
Medina-Garcia

(10) Patent No.: US 11,005,378 B2
(45) Date of Patent: May 11, 2021

(54) OPERATING A FLYBACK CONVERTER USING A SIGNAL INDICATIVE OF A RESONANT TANK CURRENT OF THE FLYBACK CONVERTER

(71) Applicant: Infineon Technologies Austria AG, Villach (AT)

(72) Inventor: Alfredo Medina-Garcia, Munich (DE)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 16/447,864

(22) Filed: Jun. 20, 2019

(65) Prior Publication Data

US 2020/0021200 A1 Jan. 16, 2020

(30) Foreign Application Priority Data

Jul. 12, 2018 (DE) .......................... 102018116883.7

(51) Int. Cl.
*H02M 3/335* (2006.01)
*H02M 1/08* (2006.01)
(Continued)

(52) U.S. Cl.
CPC ....... *H02M 3/33569* (2013.01); *H02M 1/083* (2013.01); *H02M 3/3376* (2013.01); *H02M 1/32* (2013.01); *H02M 2001/0009* (2013.01); *H02M 2001/0012* (2013.01); *H02M 2001/0035* (2013.01); *H02M 2001/0058* (2013.01)

(58) Field of Classification Search
CPC .................. H02M 1/32; H02M 1/083; H02M 2001/0012; H02M 2001/0035; H02M 2001/0009; H02M 3/33569; H02M 3/335–3/33592; H02M 3/3376; H02M 3/33523; Y02B 70/10
See application file for complete search history.

(56) References Cited

U.S. PATENT DOCUMENTS 6,061,252 A 5/2000 Hosotani
8,009,448 B2 8/2011 Liu
(Continued)

FOREIGN PATENT DOCUMENTS

CN 103107707 A 5/2013
CN 105391305 A 3/2016
(Continued)

OTHER PUBLICATIONS

Office Action, in the German language, from counterpart German Application No. 102018116883.7, dated Mar. 1, 2019, 8 pp.
(Continued)

*Primary Examiner* — Thienvu V Tran
*Assistant Examiner* — Shahzeb K Ahmad
(74) *Attorney, Agent, or Firm* — Shumaker & Sieffert, P.A.

(57) ABSTRACT

Power converter controllers, flyback converters and methods are provided which use a resonant tank current of the flyback converter as a measure for an output current of the flyback converter. A power converter controller includes a control logic circuit that is configured to use, as a measure of an output current of the flyback converter, the resonant tank current indicated by the signal at a time in a phase where there is no reflected current to the primary side of the flyback converter.

20 Claims, 8 Drawing Sheets

(51) Int. Cl.
*H02M 3/337* (2006.01)
*H02M 1/32* (2007.01)
*H02M 1/00* (2006.01)

(56) References Cited

U.S. PATENT DOCUMENTS

| | | |
|---|---|---|
| 8,824,176 B2 | 9/2014 | Peng et al. |
| 9,692,308 B2 | 6/2017 | Yu et al. |
| 9,893,635 B2 | 2/2018 | Lin |
| 10,170,974 B1* | 1/2019 | Oh .................... H02M 1/4241 |
| 2002/0101742 A1 | 8/2002 | Hosotani et al. |
| 2003/0048645 A1 | 3/2003 | Hosotani et al. |
| 2006/0098464 A1 | 5/2006 | Osaka et al. |
| 2011/0216558 A1 | 9/2011 | Uno |
| 2012/0078556 A1 | 3/2012 | Holmberg et al. |
| 2013/0121037 A1 | 5/2013 | Peng et al. |
| 2013/0163290 A1 | 6/2013 | Moon et al. |
| 2014/0132179 A1 | 5/2014 | McAuliffe et al. |
| 2015/0331436 A1 | 11/2015 | Vonach |
| 2016/0087543 A1* | 3/2016 | Jin ....................... H02M 3/337 363/21.03 |
| 2017/0187298 A1* | 6/2017 | Lin ........................ H02M 1/08 |
| 2018/0091059 A1* | 3/2018 | Nene ................ H02M 3/33507 |
| 2018/0191252 A1* | 7/2018 | Bianco ................ H02M 3/3376 |
| 2018/0287481 A1* | 10/2018 | Liu ...................... H02M 3/156 |
| 2018/0337606 A1 | 11/2018 | Ausseresse et al. |
| 2018/0351462 A1* | 12/2018 | Li .................... H02M 3/33507 |

FOREIGN PATENT DOCUMENTS

| | | |
|---|---|---|
| CN | 106787777 A | 5/2017 |
| CN | 108933515 A | 12/2018 |
| DE | 102016119786 A1 | 5/2017 |
| TW | 201014140 A | 4/2010 |

OTHER PUBLICATIONS

Office Action, in the German language, from counterpart German Application No. 102018116883.7, dated Jul. 18, 2019, 10 pp.
Office Action, in the Chinese language, from counterpart Chinese Application No. 201910629904.3, dated Dec. 18, 2020, 7 pp.

* cited by examiner

OPERATING A FLYBACK CONVERTER USING A SIGNAL INDICATIVE OF A RESONANT TANK CURRENT OF THE FLYBACK CONVERTER

This Application claims priority to German Application Number 102018116883.7, filed on Jul. 12, 2018, the entire content of which is incorporated herein by reference.

TECHNICAL FIELD

The present application generally relates to flyback converters, flyback converter controllers and to corresponding methods.

BACKGROUND

Flyback converters are a type of voltage converters which provide galvanic isolation between an input and any output. A specific type of flyback converter is an asymmetric pulse width modulation (PWM) half bridge flyback converter, referred to as APWM HB flyback converter herein. An APWM HB flyback converter is essentially a converter with an inductor of the converter being split to form a transformer, such that voltage ratios are multiplied based on a winding ratio of the transformer with an additional advantage of isolation.

In some implementations, a half bridge comprising a high-side switch and a low-side switch is used to operate the converter.

Such switches are often implemented as transistors, for example metal oxide semiconductor (MOS) field effect transistors (FET).

Furthermore, flyback converters in many applications, for example power supplies, should maintain a regulated output voltage with a wide input voltage range (for example to adapt to mains voltages in different countries), for example from 90 V AC (alternating current) up to 264 V AC. In some applications, it may also be desirable to be able to provide different output voltages.

Besides monitoring and regulating an output voltage, in some applications, it is also desirable to monitor an output current of the flyback converter. However, such a monitoring of the output current should not break the galvanic isolation between output and input side of the converter.

SUMMARY

A power converter controller as defined in claim 1, a flyback converter as defined in claim 9 and a method as defined in claim 12 are provided. The dependent claims define further embodiments.

According to an embodiment, a power converter controller is provided, comprising:
a control logic circuit configured to control at least two switches in a half bridge configuration on a primary side of a flyback converter,
an input configured to receive a signal indicative of a resonant tank current of the flyback converter,
wherein the control logic circuit is configured to use the resonant tank current indicated by the signal at a time during a phase where there is no reflected current to the primary side of the flyback converter as a measure of an output current of the flyback converter, wherein the phase where there is no reflected current is determined by the controlling of at least one switch of the at least two switches.

According to another embodiment, a flyback converter is provided, comprising:
a primary side comprising at least two switches connected in series in a half bridge configuration and a resonant tank coupled to a connection node between the at least two switches, and
a secondary side inductively coupled to the primary side,
a current measurement circuit configured to measure a resonant tank current, and
the power converter controller as mentioned above, wherein the current measurement circuit is coupled to the input of the power converter controller.

According to yet another embodiments, a method for operating a flyback converter comprising at least two switches connected in series and a resonant tank coupled to a connection node between the at least two switches is provided, comprising:
measuring a resonant tank current of the flyback converter, and
using the measured resonant tank current at a time in a phase where there is no reflected current from the secondary side to the primary side of the flyback converter as a measure for the output current of the flyback converter.

The above summary is merely intended to give a brief overview over some aspects of some embodiments and is not to be construed as limiting. In particular, other embodiments may include other features than the ones explicitly given above.

DETAILED DESCRIPTION

Figure 1A:
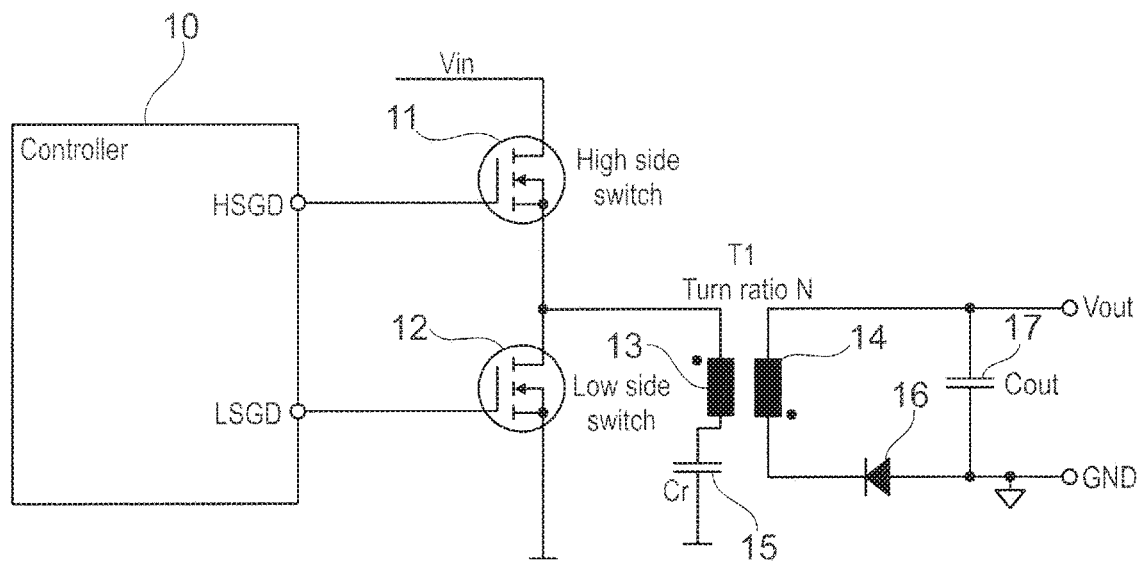
FIGS. 1A to 1C are circuit diagrams of APWM HB flyback converters according to some embodiments.

In the following, various embodiments will be described in detail referring to the attached drawings. These embodiments are given as examples only and are not to be construed as limiting in any way. For example, while embodiments may be described comprising a plurality of features or elements, this is not to be construed as limiting, and in other embodiments, some of the features or elements may be omitted, and/or may be replaced by alternative features or elements. In addition to the features or elements explicitly described, further features or elements, for example features or elements conventionally provided in flyback converter circuits like asymmetric pulse width modulation half bridge (APWM HB) flyback converter circuits, like protection mechanisms (e.g. overcurrent protection) or feedback control may be used.

Different embodiments may be combined with each other to form further embodiments unless noted otherwise. Variations and modifications described with respect to one of the embodiments may also be applicable to other embodiments.

In the embodiments shown and described, any direct electrical connection or coupling between elements, i.e. connections or couplings without intervening elements, may be replaced by an indirect connection or coupling, i.e. a connection or coupling comprising one or more additional intervening elements, and vice versa, as long as the general purpose of the connection or coupling, for example to provide a certain kind of signal, a certain kind of information or a certain kind of control, is essentially maintained. In other words, connections or couplings may be modified as long as the general purpose and function of the connection or coupling remains essentially unaltered.

A resonant tank, in this respect, is a part of a primary side of the flyback converter which has a resonance frequency. In many cases, such a resonant tank is formed by a primary winding of a transformer and one or more additional elements, in particular one or more capacitors. In such case, the resonant tank is also referred to as LC resonator herein.

Embodiments relate to flyback converters, controllers for flyback converters and associated methods. In particular, in some embodiments a controller may control a high-side switch and a low-side switch of a flyback converter for example to regulate an output voltage of the flyback converter. In some embodiments, the control is such that a current to a resonant tank of the flyback converter continuously changes or, in other words, there are no extended gaps in the current to the resonant tank. Any numerical values given herein, e.g. for currents and voltages serve only as illustrative examples and may vary, e.g. depending on a particular implementation or application or depending on environmental conditions. In some embodiments, the current to the resonant tank of the flyback converter, referred to as resonant tank current hereinafter, is measured at least in some phases of operation to obtain a measure of the output current of the flyback converter. The term "resonant tank current" does not imply that there is necessarily a resonance condition at the time the current flows, but is also used to refer to the current to the resonant tank in phases of operation where no resonance occurs. This will be explained further below in detail.

Such a control with continuously changing current may for example be effected by controlling the high-side switch and the low-side switch of the flyback converter such that an on-time of the low-side switch is kept essentially at or above half a resonance period of an LC resonator of the flyback converter, for example formed in part by a transformer leakage inductance of the flyback converter and a capacitor coupled thereto. In some cases this may prevent switching of the high side switch or low side switch while a considerable voltage is still present at its terminals (e.g. no voltage above 20V, but voltage may depend on application), so called ZVS and/or may improve performance of the flyback converter. In some embodiments, the on-time of the low-side switch is kept constant, while an output voltage is regulated by changing the on-time of the high-side switch. In embodiments described below, APWM HB flyback converters are used as examples, which is not to be construed as limiting.

Details of such a control where the on-time of the low side switch is kept constant and the output voltage is regulated by changing the on-time of the high-side switch (or vice versa in some configurations) are for example described in German patent application 10 2017 110 927.7 by the applicant.

In this respect, a switch is "on" or "closed" when it provides a low ohmic connection between terminals thereof, and is "off" or "open" in a state where it provides essentially and electric isolation between the terminals (apart possibly from some leakage currents). In some embodiments, transistors like field effect transistors, bipolar transistors or insulated gate bipolar transistors may be used as switches.

Turning now to the figures, FIG. 1A is a circuit diagram illustrating an APWM HB flyback converter according to an embodiment. The APWM HB flyback converter of FIG. 1A comprises a controller 10 controlling a high-side switch 11 and a low-side switch 12 via outputs HSGD, LSGD, respectively. In the embodiment of FIG. 1A, high-side switch 11 and low-side switch 12 are connected in series in a half-bridge configuration. In the embodiment shown, high-side switch 11 and low-side switch 12 are NMOS transistors. However, in other embodiments, other types of transistors may be used. High-side switch 11 and low-side switch 12 are coupled in series between a direct current (DC) input voltage Vin and a reference voltage, e.g. ground, as shown. High-side switch 11 and low-side switch 12 therefore form a half bridge.

In particular, controller 10 may be configured to control high-side switch 11 and low-side switch 12, and may be configured to determine an output current using techniques discussed in more detail further below.

A connection node between switches 11, 12 is coupled to a first end of a primary winding 13 of a transformer T1. A second end of primary winding 13 is coupled to ground via a capacitor 15 having a capacitance Cr.

Transformer T1 further comprises a secondary winding 14. A first end of secondary winding 14 is coupled to an output terminal to output a voltage Vout. A ground terminal GND is coupled to a second end of secondary winding 14 via a diode 16. Furthermore, an output capacitor 17 having a capacitance Cout is coupled between the output terminal and the ground terminal as shown, acting essentially as a filter.

A leakage inductance of transformer T1, in particular of primary winding 13, and capacitor 15 form an LC resonator, also referred to as resonant tank, which influences the behavior of the flyback converter of FIG. 1A as will be explained in more detail.

Transistor switches like switches 11, 12 may have a parasitic capacitance. Switching such a transistor from off to ON when a voltage is applied to it may cause electrical losses as the capacitor is discharged. Therefore, some embodiments aim at maintaining a switching of at least high-side switch 11—at a low voltage (at or near zero) applied to it, also referred to as zero voltage switching (ZVS). In some embodiments, this may be affected by controlling switches 11, 12 by controller 10 accordingly. Various conventional approaches may be used to effect such zero voltage switching, for example as described in detail in the above-captioned German application 10 2017 110 927.7.

Figure 1B:
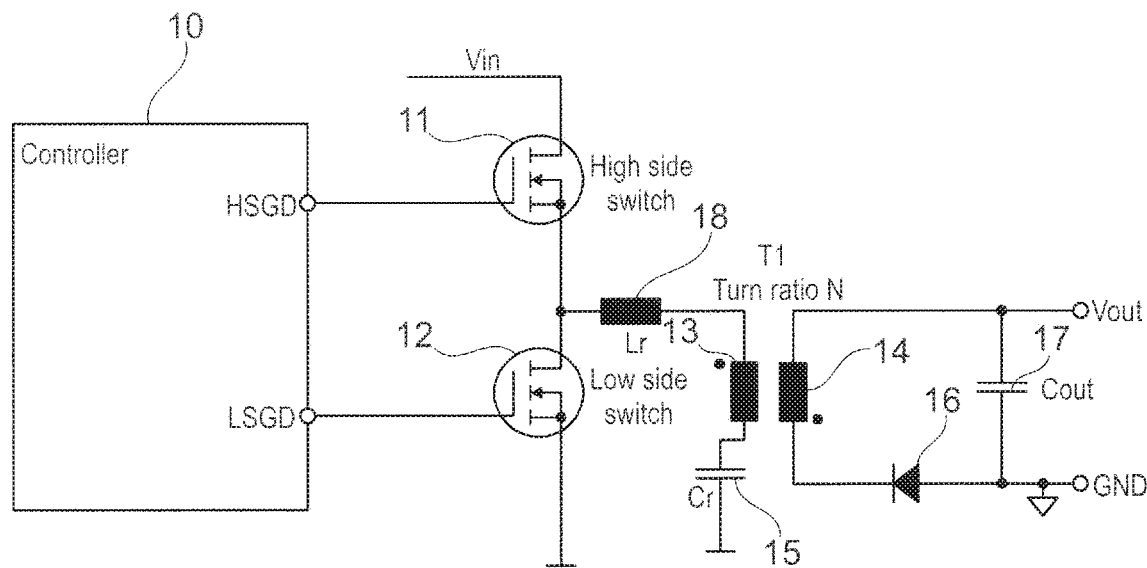
Figure 1C:
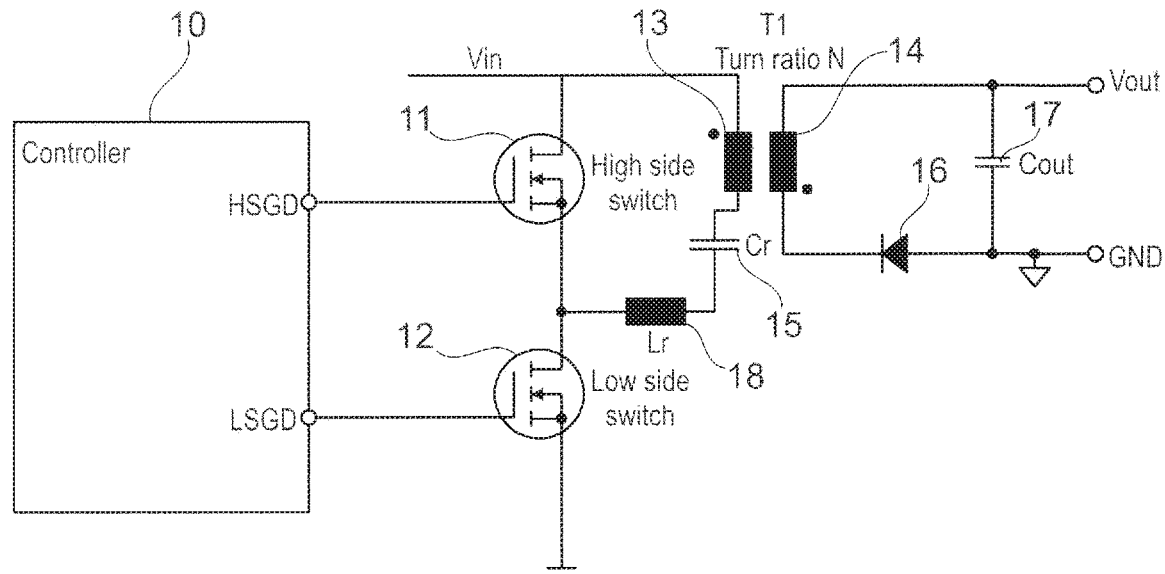

Some variations of the embodiment of FIG. 1A are shown in FIGS. 1B and 1C. In FIGS. 1A-1C, corresponding or like elements bear the same reference numerals and will not be discussed repeatedly.

FIG. 1B shows a variation of the embodiment of FIG. 1A, where an additional inductor 18 having an inductivity Lr is provided coupled between transformer T1 and the node between switches 11, 12. Such an additional inductor 18, which is purely optional, changes a resonance frequency of the above-mentioned LC resonator. Apart from the changed resonance frequency, the explanations given herein also apply to this alternative configuration.

FIG. 1C shows a further alternative configuration. While in FIGS. 1A and 1B, primary winding 13 of transformer T1 and capacitor 15 are coupled in series between the node between switches 11, 12 and ground, in FIG. 1C primary winding 13 and capacitor 15 are coupled between Vin and the node between high-side switch 11 and low-side switch 12. In such a configuration, the roles of high-side switch 11 and low-side switch 12 regarding control techniques used for controlling switches 11, 12 may be reversed. Note that in the embodiment of FIG. 1C, additional inductor 18 is provided, but also may be omitted in other embodiments.

Figure 2:
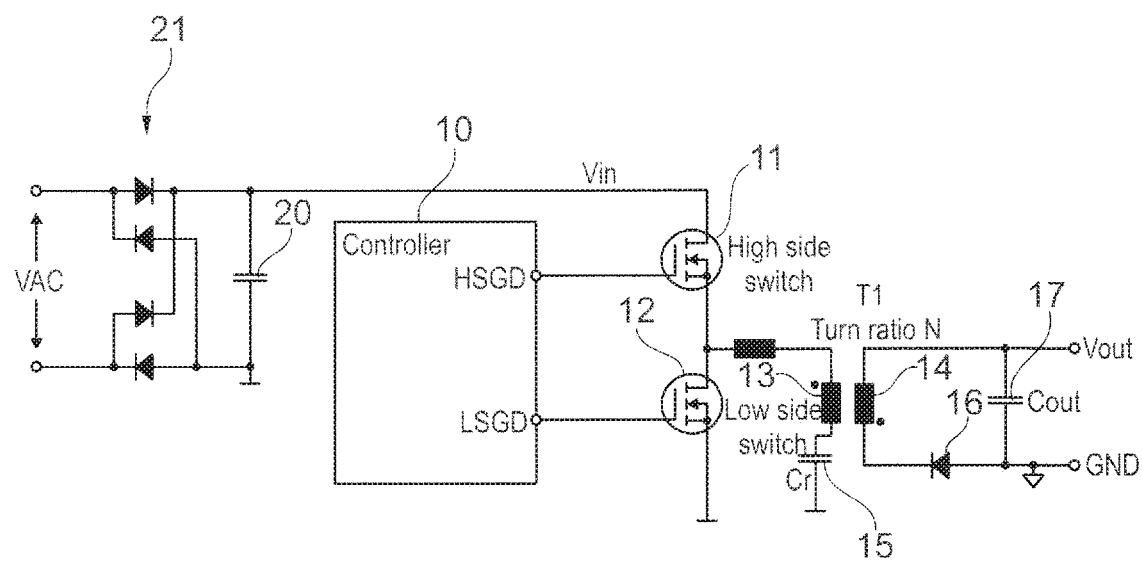
FIG. 2 is a circuit diagram of an APWM HB flyback controller according to a further embodiment.

Before going into more detail regarding implementation examples of controller 10 and associated methods, FIG. 2 illustrates a modification of the embodiment of FIG. 1A for alternating current (AC) input voltages. The embodiment of FIG. 2 is based on the embodiment of FIG. 1A, and like elements bear the same reference numerals.

In FIG. 2, the APWM HB flyback converter receives an AC voltage VAC, which is rectified by a rectifier including a diode arrangement 21 including four diodes and a capacitor 20 for filtering, thus resulting essentially in a DC-like voltage Vin. Instead of the rectifier arrangement shown in FIG. 2, other conventional rectifier arrangements may be used.

Furthermore, apart from the functioning and operation of controller 10, as will be discussed below and other modifications as discussed below, instead of the specific APWM HB flyback converter arrangement shown in FIGS. 1A and 2 including switches 11, 12, transformer T1, capacitor 15, diode 16 and output capacitor 17 other converter topologies may be used, for example the topologies shown in FIG. 1B or 1C.

Figure 3:
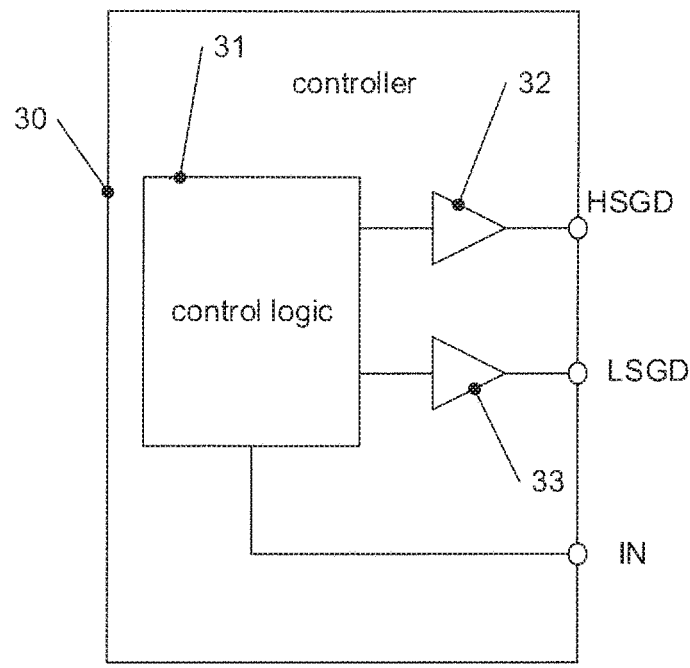
FIG. 3 is a diagram of a controller according to an embodiment.

FIG. 3 is a schematic diagram of a controller 30 according to an embodiment, which may be used as controller 10 in the embodiments of FIGS. 1 and 2. Controller 30 of FIG. 3 comprises a control logic 31. Control logic 31 may comprise one or more logic circuits, one or more application specific integrated circuits (ASICs), or part thereof, one or more processors and/or other control circuits. Control logic 31 receives one or more input signals IN via one or more input terminals. Input signal(s) IN may for example contain information about an input voltage (for example Vin or VAC of FIG. 1 or 2) or of a required or actual output voltage (for example Vout in FIGS. 1 and 2), or an output signal from an external regulator. Any input signals also used in conventional flyback converters based on which the flyback converter is controlled may be used.

Furthermore, in embodiments discussed herein, input signal IN comprises a signal indicative of a resonant tank current, i.e. a current flowing to, from or in the resonant tank of the converter, for example the LC resonator mentioned above. This signal in embodiment is then used a measure of an output current of the flyback converter. For example, in embodiments the output current may be calculated based on this signal, or the signal may be directly used as a measure of the output current. For example, as will be described later in more detail, the resonant tank current may be converted to a voltage using a shunt resistor, and this voltage may be provided as signal IN to controller 30. Controller 30 may comprise an analog-to-digital converter to digitize signals like the above-mentioned voltage, or an external analog-to-digital converter may be used.

In embodiments, the signal is used as a measure of the output current at one or more times in phases where there is no so-called reflected current, or, in other words, the magnetizing current corresponds to the resonant tank current. This will be explained later in more detail. As controller 30 also controls switching off a high-side switch like high-side switch 11 of FIGS. 1 and 2 and a low-side switch like low-side switch 12 of FIGS. 1 and 2, controller 30 "knows" in which phases of operation the flyback converter currently is, in particular if it is in a phase where there is a reflected current, and therefore may decide whether to use the signal indicative of the resonant tank current as measure for the output current or not.

In response to this measure of the output current, controller 30 may for example detect an overcurrent situation and take corresponding measures (for example reduce output power) or may recognize a state where only a low output power is required (if the output current falls below a predefined threshold, for example) and may for example switch to a burst mode of operation or other power saving mode. A burst mode is a mode of operation with first periods where switching of the high-side switch and the low-side switch is disabled (both switches open) and second periods where switching is enabled, the latter periods being referred to as bursts. The first periods and second periods occur alternatingly in burst mode.

As already mentioned, in response to the input signal IN, control logic 31 may control a high-side driver 32 to output control signal HSGD to control a high-side switch (for example high-side switch 11 of FIGS. 1 and 2) and controls a low-side driver 33 to output a control signal LSGD to control a low-side switch (for example low-side switch 12 of FIGS. 1 and 2) to generate a required output voltage. In particular, for operating a APWM HB flyback converter high-side switch 11 and low-side switch 12 may be switched on and off in an alternating manner with dead times (times where both switches are off) in between.

Figure 4:
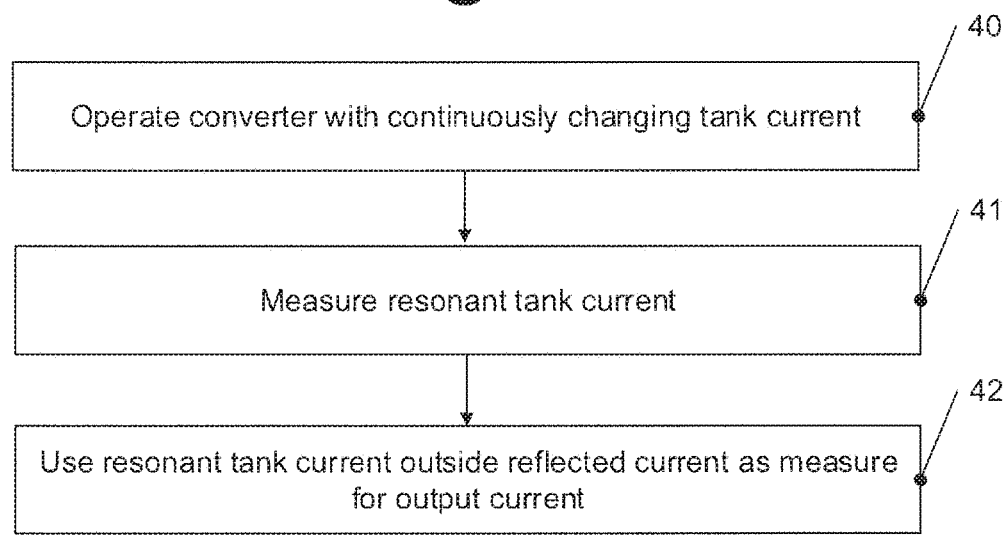
FIG. 4 is a flowchart illustrating a method according to an embodiment.

FIG. 4 is a flowchart illustrating a method for operating a flyback converter according to some embodiments. At 40, the method of FIG. 4 comprises operating the flyback converter with a continuously changing resonant tank current. It should be noted that in other phases of operation, the converter may be operated using different techniques. In such an operation, apart from short dead times where both high side switch and low-side switch are open to prevent conduction across both switches, there is always a forced voltage across applied to the transformer. This forces a continuous current and is also referred to as continuous current mode (CCM). Continuously changing tank currents in particular indicate that there are no extended periods of time where no tank current flows, i.e. no extended gaps in the current flow as it is the case for discontinuous conduction mode (DCM).

At 41, the method comprises measuring a resonant tank current. For example, measuring the resonant tank current as will be explained later may comprise measuring the resonant tank current using a shunt resistor or any other conventional circuit or device for measuring a current.

At 42, the method comprises using the resonant tank current outside phases where there is a reflected current as will be described later in detail as a measure for the output current, for example for calculating the output current or directly as a measure for the output current. Using this measure, for example low current conditions where a low power mode may be entered or overcurrent conditions where protection measures may need to be taken may be detected.

Figure 5:
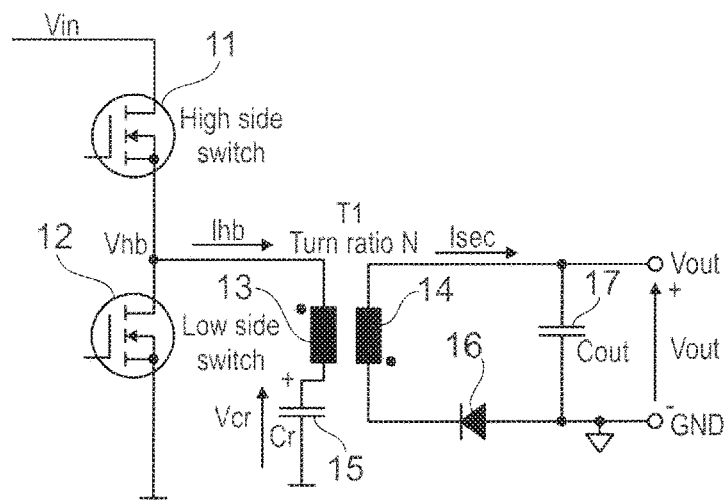
FIG. 5 is a diagram explaining voltages and currents in flyback converters according to embodiments.

FIG. 5 reproduces a part of FIGS. 1 and 2 and is used to define currents and voltages used in the following explanations. A voltage Vhb corresponds to the voltage at the node between high-side switch 11 and low-side switch 12. A current Ihb is the already mentioned resonant tank current flowing from this node to primary winding 13 and capacitor 15 and therefore to the LC resonator serving as resonant tank. A voltage Vcr is a voltage across capacitor 15. A current Isec is a secondary current flowing from secondary winding 14. Vout denotes the output voltage.

Furthermore, in the following, Im will be used to refer to the magnetizing current of transformer T1, Lm to a magnetizing inductance of transformer T1 and Llk to a leakage inductance of transformer T1. The magnetizing current Im is the current associated with the magnetic flux in the transformer core, in other words, the portion of the transformer input current that leads to magnetic flux. The leakage inductance derives from the electrical property of an imperfectly coupled transformer (i.e. a real transformer) whereby each winding behaves as a self-inductance constant in series with a winding respective ohmic resistance constant, these four winding constants also interacting with the transformers mutual inductance. The leakage inductance is due to leakage field not linking with all turns of the primary and secondary windings. In case an additional inductor like inductor 18 of FIGS. 1 and 2 is provided, for the following explanations this amounts essentially to a change of the effective leakage inductance.

Figure 6:
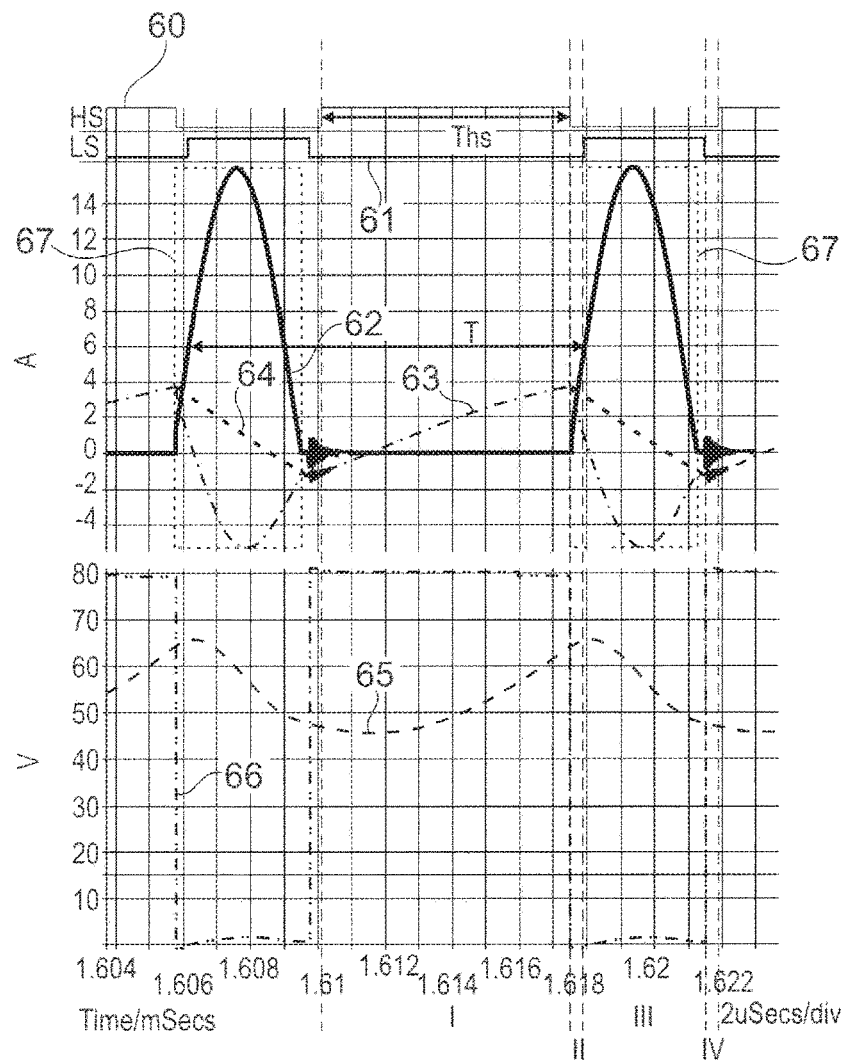
FIG. 6 is a diagram for illustrating operation phases of a flyback converter according to some embodiments.

FIG. 6 illustrates various of these properties during operation of an APWM HB flyback converter. A curve 60 illustrates an example switching of the high-side switch 11, and a curve 61 illustrates an example switching of the low-side switch. As can be seen, high-side switch 11 and low-side switch 12 are switched on and off in an alternating manner periodically. A period length of the switching is denoted T in FIG. 6, and an on-time of the high-side switch is denoted Ths.

A curve 62 illustrates the secondary current Isec, a curve 63 illustrates the resonant tank current Ihb, a curve 64 illustrates the current Im, a curve 65 illustrates the voltage Vcr and a curve 66 illustrates the voltage Vhb.

Within a box 67, the above-mentioned resonance is visible, most notably in curves 62 (Isec) and 63 (Ihb). The secondary current Isec reflects into the primary winding and reduces the resonant tank current Ihb to deviate from the magnetizing current Im. This is the phase where there is a reflected current and the resonant tank current in embodiments is not used as a measure for the output current. Furthermore, as can be seen in curve 66, during the resonance Vhb is non-zero, while being essentially zero at the beginning and end of the resonance.

Before discussing the implications thereof, the operation of the APWM HB flyback converter according to some embodiments will be briefly described in a general manner.

Each period T may be divided into four operation phases, labeled I to IV for an example operation in FIG. 6.

In operation phase I, high-side switch 11 is on, and low-side switch 12 is off. Therefore, the input voltage Vin is applied to the first end of primary winding 13 of transformer T1 and to capacitor 15. Current Ihb increases as can be seen in curve 63, and capacitor 15 is charged, leading to increasing Vcr during this period. Current Isec during this period is negligible as during this phase diode D1 is reversed biased.

In operation phase II, both switches 11, 12 are off, also referred to as dead time. The inductance of transformer T1 forces the current built during operation phase I to keep flowing, magnetizing current Im decreasing slowly and current Ihb decreasing more steeply at the beginning of phase II. As both switches 11, 12 are off, voltage Vhb decreases (charging/discharging parasitic capacitances, also referred to as output capacitances, of switches 11, 12) until voltage Vhb is clamped by a parasitic diode of low-side switch 12.

In operation phase III, high-side switch 11 is off while low-side switch 12 is turned on. Vcr continues to decrease. Isec and Ihb show a sinusoidal shape caused by the mentioned resonance. In particular, the voltage in the transformer secondary winding 14 is inverted compared to operation phase I, forward biasing diode 16. Secondary current Isec starts increasing, and this secondary current is reflected to the primary side and added to the magnetizing current to result in the resonant tank current.

As can be seen, when low-side switch 12 switches on, zero voltage switching is achieved, as the voltage Vhb is zero when the low-side switch switches on.

In phase IV, both switches 11, 12 are off, also referred to as dead time. Somewhat similar to operation phase II, the current built in transformer T1 forces Vhb to increase until a body diode of high-side switch clamps the voltage. This in embodiments allows zero voltage switching of high-side switch 11 when again going to operation phase I, where high-side switch 11 is turned on.

In embodiments, the on-time of the low-side switch is kept at at least half of the resonance period as shown in FIG. 6, for example between 90% of the time of half the resonance period and 120% of half the time of the resonance period. This, in some embodiments, may prevent oscillation and stress while maintaining zero voltage switching.

As mentioned, the resonant tank current is used as a measure of the output current in phases where there is no reflected current, or, in other words, in phases where the resonant tank current according to curve 63 and the magnetizing current according to curve 64 are substantially equal. In the example of FIG. 6, the resonant tank current during operation phase I, during operation phase IV or at the end of operation phase III may be used as a measure for the output current. The output current, in this respect, as shown in FIG. 7 refers to the current output to a load 72 by a power supply 71 including the flyback converter discussed, the power supply being supplied by an input voltage source 70.

Figure 8A:
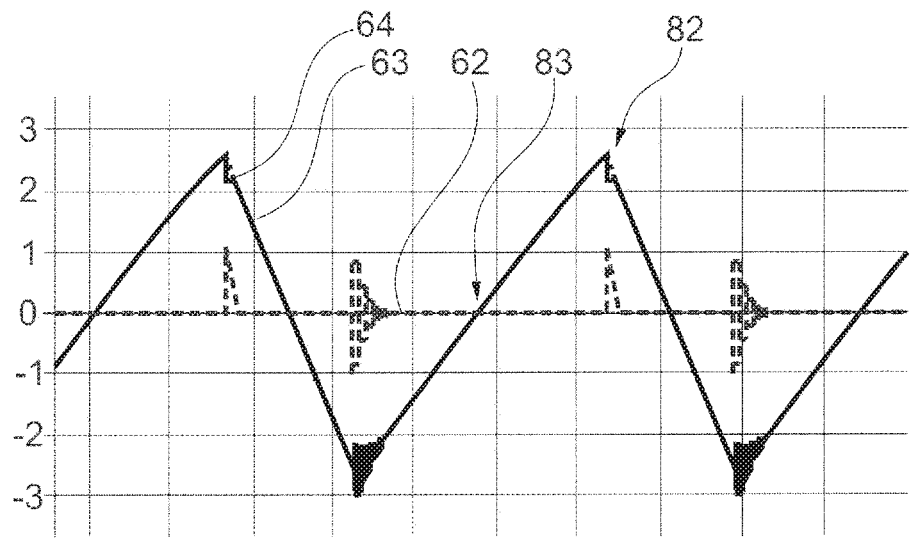
FIGS. 8A to 8C show currents in a flyback converter for different output currents.
Figure 8B:
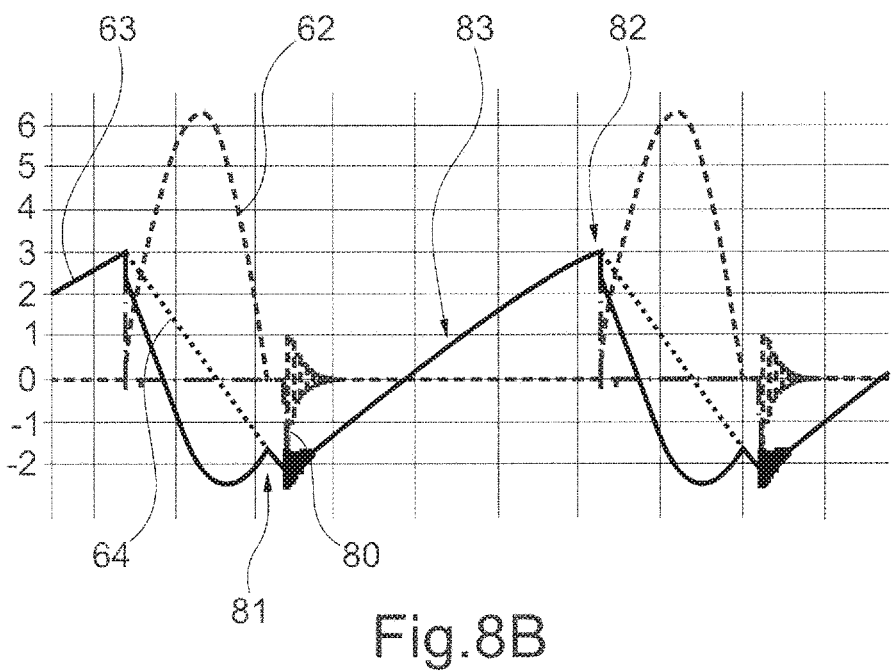
Figure 8C:
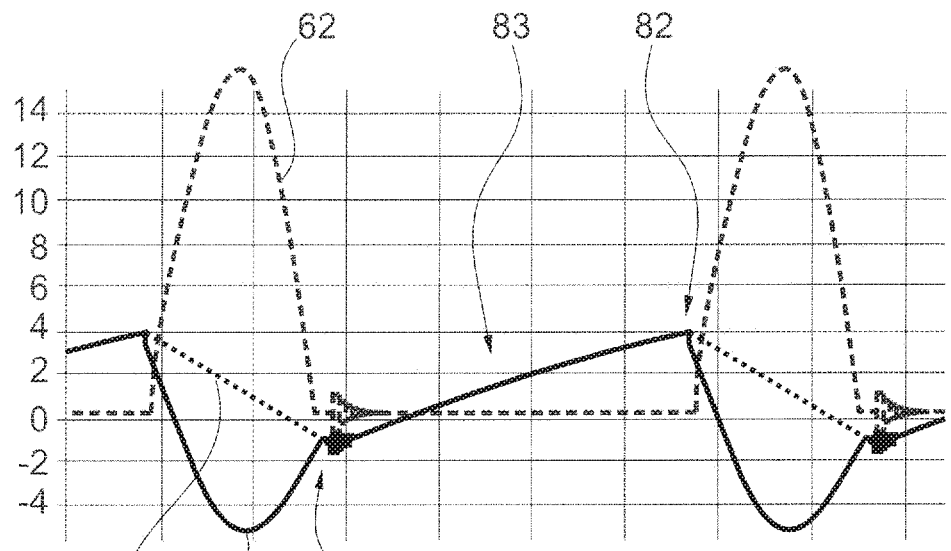

Next, dependence of the resonant tank current on the output current will be explained referring to FIGS. 8A to 8C. In FIGS. 8A to 8C, similar to FIG. 6, a curve 62 shows the secondary current Isec, a curve 63 shows the resonant tank current Ihb, and a curve 64 shows the magnetizing current Im.

Figure 7:
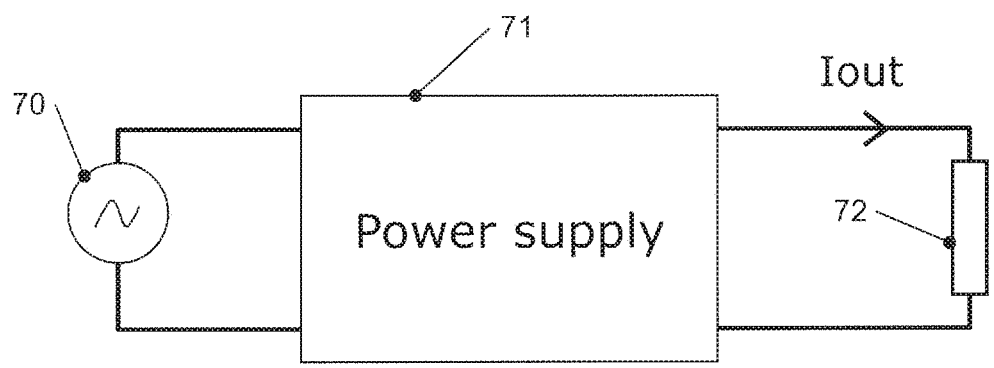
FIG. 7 is a simple diagram illustrating an output current of a flyback converter.

FIG. 8A shows a case where the output current Iout shown in FIG. 7 is zero. In this case, the secondary current Isec apart from some noise is zero, too, and the resonant tank current Ihb corresponds to the magnetizing current Im. In the example shown, a peak of the resonant tank current according to curve 63 at 82 is at about 2.5 A, this value depending on the specific dimensioning and implementation of the power converter.

FIG. 8B illustrates the same currents as in FIG. 8A for a case where an output current is 1.25 A. Here, resonances can be seen in the secondary current Isec according to curve 62, which are reflected to the primary side, such that the resonance is also visible in the resonant tank current Ihb. During this resonance, curve 63 therefore deviates from curve 62. In the remaining time, between time points marked by 81 (slightly before the minimum) and 82 (peak current) in FIG. 8B, the resonant tank current Ihb may be used as a measure for the output current. For example, the peak current of the resonant tank current at 82 in the example of FIG. 8B increases to about 3 A.

Generally, the peak current may be calculated by Ipeak=Ipeak,0+Iout/N, where Ipeak is the peak current for a particular output current Iout, and Ipeak,0 is the output current for 0 A (2.5 A in the present example) and N is the winding ratio of the transformer (2.5 taken as an example in FIGS. 8A to 8C), which is known by design. Therefore, there is a clear mathematical relationship between the output current Iout and the peak current of the resonant tank current Ihb. Consequently, for example the peak current may be taken as a measure for the output current. However, such a relationship exists also for all other points of the resonant tank current between curves 81 and 82 (i.e. where there is no reflected current), so any of the points, for example a midpoint at 83 between minimum and maximum of the resonant tank current, may be taken as a measure for the output current.

In the example of FIG. 8C, the output current is 3.25 A, and the peak current correspondingly is at 3.8 A, according to the equation above. Again, other points in the curves are shifted as well depending on the output current, so any current between points 81, 82 may be used, for example also the minimum current at the end of phase III of FIG. 6 or in phase IV of FIG. 6, where the magnetizing current Im and the resonant tank current also coincide or the midpoint at 83.

Furthermore, as can be seen in FIGS. 8A to 8C the measurement in some embodiments takes place during an operation where the resonant tank current Ihb continuously changes over time based on operation of switches (CCM), in contrast to operation where in each cycle switching is interrupted and therefore the current flow is interrupted for an extended period of time (DCM), as explained above in more detail.

Figure 9:
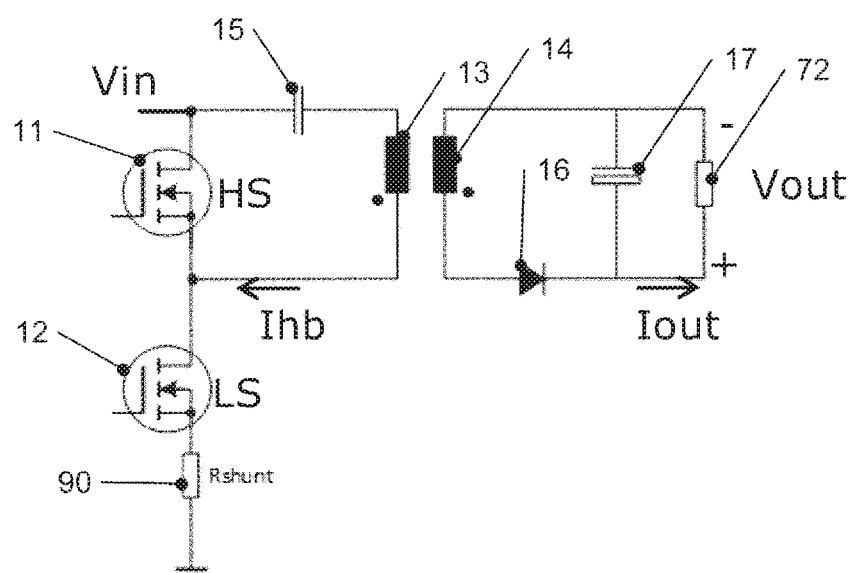
FIGS. 9 to 11 illustrate various possibilities for current measurements in flyback converters according to some embodiments.
Figure 10:
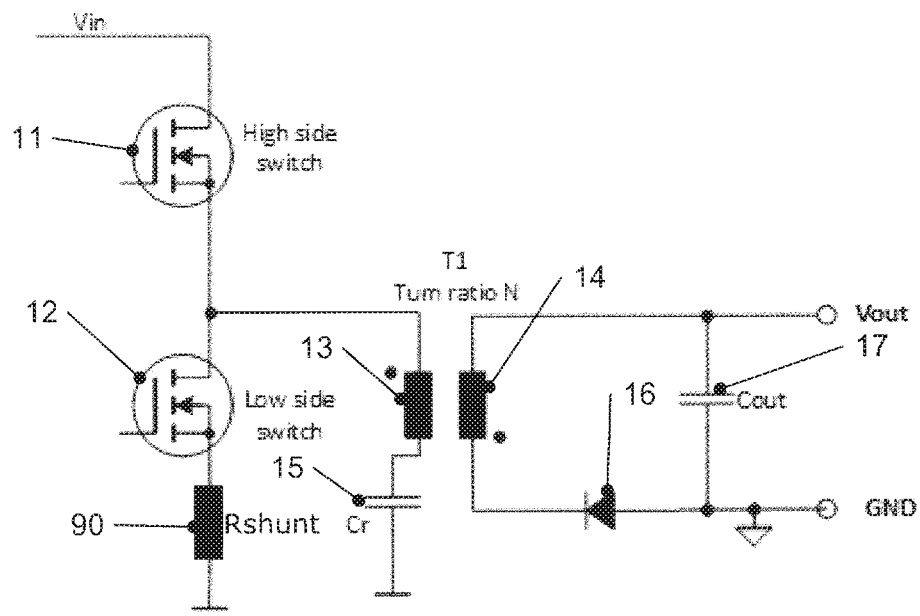
Figure 11:
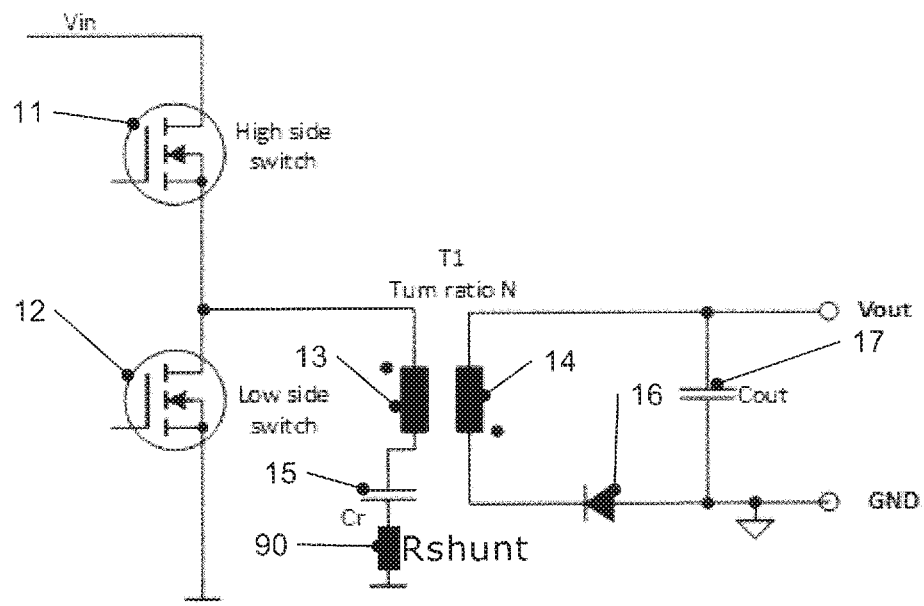

Next, some approaches for sensing the resonant tank current will be explained with reference to FIGS. 9 to 11. FIGS. 9 to 11 illustrate flyback converters or parts thereof as explained with reference to previous figures and like elements bear the same reference numerals and will not be explained again.

In the embodiment of FIG. 9, a shunt resistor 90 for measuring the resonant tank current is provided between low-side switch 12 and ground in a configuration where a resonant tank is parallel to high-side switch 11. Shunt resistor 90 may have a low resistance value, for example 5Ω or less, or 1Ω or less. A voltage drop across shunt resistor 90 corresponds to the tank current in phases where high-side switch 11 is open and low-side switch 12 is closed. A voltage drop across shunt resistor 90 is indicative of the resonant tank current and may for example be digitized by an analog-to-digital converter provided in a controller like controller 30 of FIG. 3 or by an external analog-to-digital converter.

In the example of FIG. 9, in particular the resonant tank current may be measured during phase I of FIG. 6 (the roles of low-side switch and high-side switch are reversed in FIG. 9, with the resonant tank parallel to the high-side switch), and for example the peak of the resonant tank current may be used as a measure for the output current.

FIG. 10 shows another configuration where a shunt resistor for measuring the resonant tank current is coupled between low-side switch 12 and ground. In case of FIG. 10, the resonant tank comprising primary winding 13 and capacitor 15 is coupled in parallel to low-side switch 12, as is the case for the example of FIGS. 5 and 6. In this case, for example the resonant tank current at the end of phase III may be measured (where magnetizing current Im and resonant tank current Ihb coincide again after the resonance) and be used as a measure for the resonant tank current.

FIG. 11 illustrates a further alternative, where in a flyback converter again similar to the one shown in FIG. 5, a shunt resistor 90 is coupled between capacitor 15 and ground. Through this arrangement, the resonant tank current in all phases may be measured.

It should be noted that the shunt resistors shown serve merely as examples, and other types of current measurement devices and other placements of the shunt resistor are also possible. For example, capacitive or inductive current sensing using capacitive or magnet field sensors may be employed.

It should also be noted that the use of MOS transistors as switches in the embodiments shown is merely an example, and other kinds of switches like bipolar transistors or insulated gate bipolar transistors may also be used, and such switch transistors may be based on different materials, like silicon, gallium nitride, silicon carbide, etc.

Techniques disclosed herein have been verified by measurements. Such measurements show that for example the peak of the resonant tank current is independent of the input voltage, such that irrespective of the input voltage Vin to the flyback converter, the output current may be measured by measuring the resonant tank current, as mentioned above.

At least some embodiments are defined by the examples given below:

EXAMPLE 1

A power converter controller, comprising:
a control logic circuit configured to control at least two switches in a half bridge configuration on a primary side of a flyback converter,
an input configured to receive a signal indicative of a resonant tank current of the flyback converter,
wherein the control logic circuit is configured to use the resonant tank current indicated by the signal at a time in a phase where there is no reflected current to the primary side of the flyback converter as a measure of an output current of the flyback converter, wherein the phase where there is no reflected current is determined by the controlling of at least one switch of the at least two switches.

EXAMPLE 2

The power converter controller of example 1, wherein the control logic circuit is configured to use a peak current of the resonant tank current as indicated by the signal as the measure of the output current.

EXAMPLE 3

The power converter controller of example 1, wherein the control logic circuit is configured to use one of a minimum current of the resonant tank current as indicated by the signal or a current in the middle between the minimum current and a peak current of the resonant tank current as measure for the output current.

EXAMPLE 4

The power converter controller of any one of examples 1-3, wherein the control logic circuit is configured to calculate the output current based on the resonant tank current as indicated by the signal.

EXAMPLE 5

The power converter controller of any one of examples 1-4, wherein the control logic circuit is configured to control the at least one switch to provide a continuously changing resonant tank current.

EXAMPLE 6

The power converter controller of any one of examples 1-5, wherein the control logic circuit is configured to detect an overcurrent condition based on the resonant tank current as indicated by the signal.

EXAMPLE 7

The power converter controller of any one of examples 1-6, wherein the control logic circuit is configured to detect a low output power condition of the flyback converter based on the resonant tank current as indicated by the signal, and change controlling of the at least two switches to a low power mode of operation in response to detecting the low output power condition.

EXAMPLE 8

The power converter controller of example 7, wherein the low power mode comprises a burst mode of operation.

EXAMPLE 9

A flyback converter, comprising:
a primary side comprising at least two switches connected in series in a half bridge configuration and a resonant tank coupled to a connection node between the at least two switches, and
a secondary side inductively coupled to the primary side,
a current measurement circuit configured to measure a resonant tank current, and
the power converter controller of any one of examples 1-8, wherein the current measurement circuit is coupled to the input of the power converter controller.

EXAMPLE 10

The flyback converter of example 9, wherein the current measurement circuit comprises a shunt resistor, a capacitive current sensor and/or a magnetic field based current sensor.

EXAMPLE 11

The flyback converter of example 9 or 10, wherein the at least two switches comprises a high-side switch and a low-side switch, wherein the resonant tank is coupled to a node between the high-side switch and the low-side switch, wherein the current measurement circuit is provided in at least one position of:
between the low-side switch and ground, and
between the resonant tank and ground.

EXAMPLE 12

A method for operating a flyback converter comprising at least two switches connected in series and a resonant tank coupled to a connection node between the at least two switches, comprising:
measuring a resonant tank current of the flyback converter, and
using the measured resonant tank current at a time in a phase where there is no reflected current from a secondary side to a primary side of the flyback converter as a measure for the output current of the flyback converter.

EXAMPLE 13

The method of example 12, further comprising operating the flyback converter with a continuously changing tank current while measuring the resonant tank current.

EXAMPLE 14

The method of example 12 or 13, further comprising calculating the output current based on the resonant tank current.

EXAMPLE 15

The method of any one of examples 12-14, further comprising detecting an overcurrent condition based on the measured resonant tank current.

EXAMPLE 16

The method of any one of examples 12-15, further comprising a low output power condition based on the resonant tank current, and changing operation of the flyback converter to a low power mode of operation in response to detecting the low output power condition.

EXAMPLE 17

The method of any one of examples 12-16, wherein using the resonant tank current as a measure for the output current comprising using a peak value of the resonant tank current as a measure for the output current.

EXAMPLE 18

The method of any one of examples 12-16, wherein using the resonant tank current as a measure for the output current comprises using one of a minimum of the resonant tank current or a value of the resonant tank current in the middle between the minimum and a peak value of the resonant tank current as measure for the output current.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A power converter controller comprising:
a control logic circuit configured to control at least two switches in a half bridge configuration on a primary side of a flyback converter, the at least two switches including a high-side switch and a low-side switch, and
an input configured to receive a signal indicative of a resonant tank current of the flyback converter,
wherein the control logic circuit is configured to:

use the resonant tank current indicated by the signal at a time in a phase where there is no reflected current to the primary side of the flyback converter as a measure of an output current of the flyback converter;

calculate the output current based on a peak current of the resonant tank current as indicated by the signal at the time in the phase where there is no reflected current and further based on the peak current of the resonant tank current while the output current of the flyback converter is zero; and control the low-side switch to keep the on-time of the low-side switch constant, wherein the phase where there is no reflected current is determined by the controlling of at least one switch of the at least two switches, and wherein the phase occurs:
when the high-side switch is turned on; or
during a dead time after the low-side switch is turned off and before the high-side switch is turned on.

2. The power converter controller of claim 1, wherein the control logic circuit is configured to use a peak current of the resonant tank current as indicated by the signal as the measure of the output current.

3. The power converter controller of claim 1, wherein the control logic circuit is configured to use one of a minimum current of the resonant tank current as indicated by the signal or a current in a middle time between the minimum current and a peak current of the resonant tank current as measure for the output current.

4. The power converter controller of claim 1, wherein the control logic circuit is configured to control the at least one switch to provide a continuously changing resonant tank current.

5. The power converter controller of claim 1, wherein the control logic circuit is configured to:
detect an overcurrent condition based on the resonant tank current as indicated by the signal at the time in the phase where there is no reflected current; and
reduce an output power of the flyback converter in response to detecting the overcurrent situation.

6. The power converter controller of claim 1, wherein the control logic circuit is configured to:
detect a low output power condition of the flyback converter based on the resonant tank current as indicated by the signal at the time in the phase where there is no reflected current, and
change controlling of the at least two switches to a low power mode of operation in response to detecting the low output power condition.

7. The power converter controller of claim 6, wherein the low power mode comprises a burst mode of operation.

8. The power converter controller of claim 1, wherein the control logic circuit is further configured to:
determine whether the at least two switches are in the dead time after the low-side switch is turned off and before the high-side switch is turned on;
measure the resonant tank current using the signal in response to determining that the at least two switches are in the dead time after the low-side switch is turned off and before the high-side switch is turned on;
detect an overcurrent situation for the output current using the measured resonant tank current; and
reduce an output power of the flyback converter in response to detecting the overcurrent situation.

9. The power converter controller of claim 1, wherein the control logic circuit is configured to control the low-side switch to keep the on-time of the low-side switch between 90% of a time of half a resonance period and 120% of the time of half the resonance period.

10. The power converter controller of claim 1, wherein the control logic circuit is configured to control the high-side switch using peak current control.

11. A flyback converter comprising:
a primary side comprising at least two switches connected in series in a half bridge configuration and a resonant tank coupled to a connection node between the at least two switches, the at least two switches including a high-side switch and a low-side switch,
a secondary side inductively coupled to the primary side,
a current measurement circuit configured to measure a resonant tank current, and
a power converter controller comprising:
a control logic circuit configured to control the at least two switches in the half bridge configuration, and
an input configured to receive a signal indicative of a resonant tank current of the flyback converter,
wherein the control logic circuit is configured to:
use the resonant tank current indicated by the signal at a time in a phase where there is no reflected current to the primary side of the flyback converter as a measure of an output current of the flyback converter;
calculate the output current based on a peak current of the resonant tank current as indicated by the signal at the time in the phase where there is no reflected current and further based on the peak current of the resonant tank current while the output current of the flyback converter is zero; and
control the low-side switch to keep the on-time of the low-side switch constant,
wherein the phase where there is no reflected current is determined by the controlling of at least one switch of the at least two switches,
wherein the phase occurs:
when the high-side switch is turned on; or
during a dead time after the low-side switch is turned off and before the high-side switch is turned on, and
wherein the current measurement circuit is coupled to the input of the power converter controller.

12. The flyback converter of claim 11, wherein the current measurement circuit comprises a shunt resistor, a capacitive current sensor and/or a magnetic field based current sensor.

13. The flyback converter of claim 11,
wherein the resonant tank is coupled to a node between the high-side switch and the low-side switch, and
wherein the current measurement circuit is provided in at least one position of:
between the low-side switch and ground; or
between the resonant tank and ground.

14. A method for operating a flyback converter comprising at least two switches connected in series and a resonant tank coupled to a connection node between the at least two switches, the at least two switches including a high-side switch and a low-side switch, the method comprising:
measuring a resonant tank current of the flyback converter;
using the measured resonant tank current at a time in a phase where there is no reflected current from a secondary side to a primary side of the flyback converter as a measure for the output current of the flyback converter;

calculating the output current based on a peak current of the resonant tank current as indicated by the signal at the time in the phase where there is no reflected current and further based on the peak current of the resonant tank current while the output current of the flyback converter is zero; and controlling the low-side switch to keep the on-time of the low-side switch constant, wherein the phase occurs:
- when the high-side switch is turned on; or
- during a dead time after the low-side switch is turned off and before the high-side switch is turned on.

15. The method of claim 14, further comprising operating the flyback converter with a continuously changing tank current while measuring the resonant tank current.

16. The method of claim 14, further comprising:
detecting an overcurrent condition based on the measured resonant tank current as indicated by the signal at the time in the phase where there is no reflected current; and
reducing an output power of the flyback converter in response to detecting the overcurrent situation.

17. The method of claim 14, further comprising:
detecting a low output power condition based on the resonant tank current as indicated by the signal at the time in the phase where there is no reflected current, and
changing operation of the flyback converter to a low power mode of operation in response to detecting the low output power condition.

18. The method of claim 14, wherein using the resonant tank current as a measure for the output current comprises using a peak value of the resonant tank current as a measure for the output current.

19. The method of claim 14, wherein using the resonant tank current as a measure for the output current comprises using one of a minimum of the resonant tank current or a value of the resonant tank current in a middle time between the minimum and a peak value of the resonant tank current as measure for the output current.

20. The method of claim 14, further comprising:
determining whether the at least two switches are in the dead time after the low-side switch is turned off and before the high-side switch is turned on;
measuring the resonant tank current using the signal in response to determining that the at least two switches are in the dead time after the low-side switch is turned off and before the high-side switch is turned on;
detecting an overcurrent situation for the output current using the measured resonant tank current; and
reducing an output power of the flyback converter in response to detecting the overcurrent situation.

* * * * *